United States Patent [19]

Gerk

[11] Patent Number: 4,574,003

[45] Date of Patent: Mar. 4, 1986

[54] PROCESS FOR IMPROVED DENSIFICATION OF SOL-GEL PRODUCED ALUMINA-BASED CERAMICS

[75] Inventor: Alvin P. Gerk, Lewiston, N.Y.

[73] Assignee: Minnesota Mining and Manufacturing Co., Saint Paul, Minn.

[21] Appl. No.: 606,500

[22] Filed: May 3, 1984

[51] Int. Cl.$^4$ .................. C04B 35/10; C09C 1/68
[52] U.S. Cl. .......................... 51/309; 51/296;
  252/315.7; 423/628; 501/12; 501/80; 501/105;
  501/118; 501/127; 501/153
[58] Field of Search ............ 501/12, 153, 118;
  423/628, 629, 630; 252/315.7; 51/309

[56] References Cited

U.S. PATENT DOCUMENTS

| | | | |
|---|---|---|---|
| 3,325,247 | 6/1967 | Magee | 423/628 |
| 3,417,028 | 12/1968 | Montgomery | 423/628 X |
| 3,637,406 | 1/1972 | Bailey | 501/153 X |
| 4,063,856 | 12/1977 | Dziedzic | 425/8 X |
| 4,181,532 | 1/1980 | Woodhead | 501/153 X |
| 4,314,827 | 2/1982 | Leitheiser et al. | 51/309 X |
| 4,349,456 | 9/1982 | Sowman | 501/12 X |
| 4,472,512 | 9/1984 | Lane et al. | 501/80 |
| 4,518,397 | 5/1985 | Leitheiser et al. | 51/309 X |

FOREIGN PATENT DOCUMENTS 1594588  7/1981  United Kingdom ................ 501/153

OTHER PUBLICATIONS

Fletcher, J. M. et al., "Application of Sol-Gel Processes to Industrial Oxides"—Chemistry & Industry, Jan. 13, 1968, pp. 48–51.

Primary Examiner—Helen M. McCarthy
Attorney, Agent, or Firm—Donald M. Sell; James A. Smith; Richard Francis

[57] ABSTRACT

The sol-gel process for forming dense, alumina-base ceramics, the process comprising
1. preparing a dispersion of aluminum oxide monohydrate containing a precursor of a modifying additive in the form of a soluble salt;
2. gelling the dispersion;
3. drying the gel dispersion to form a solid;
4. calcining the solid; and
5. sintering the calcined solid, is improved by adding to the dispersion at least about 10 weight percent, based on the oxide equivalent of the soluble salt precursor, of at least one densification aid selected from the group consisting of alcohols, glycols and polyether compounds having a vaporization point in excess of the temperature at which the dispersion is dried. This improved process is particularly useful for manufacturing abrasive grains.

9 Claims, No Drawings

PROCESS FOR IMPROVED DENSIFICATION OF SOL-GEL PRODUCED ALUMINA-BASED CERAMICS

BACKGROUND OF THE INVENTION

1. Field of the Invention

This invention relates to the production of dense, alumina-based ceramic materials which are useful as, among other things, abrasive grains. In one aspect, this invention relates to producing dense alumina-based ceramics from a sol-gel process while in another aspect, the invention relates to the use of densification aids in the process which facilitate sintering, and thereby improves the densifications of the final product.

2. Description of the Prior Art

The preparation by a sol-gel process of dense, alumina-based ceramic abrasive grain is known. U.S. Pat. No. 4,314,827 describes a process of making an abrasive mineral employing chemical ceramic technology by gelling a colloidal dispersion or hydrosol of alumina containing at least one precursor of at least one modifying component followed by dehydration and firing. A preferred method of addition of the modifying component is in the form of a soluble salt such as magnesium nitrate. Other disclosures in this area include U.S. Pat. No. 4,181,532 and "Application of Sol-Gel Processes to Industrial Oxides", Jan. 13, 1968, *Chemistry and Industry*.

While all of these references disclose useful techniques for making dense alumina based ceramic material useful as abrasive grains, none produces a completely satisfactory product. The material which results from most, if not all, of these processes is well below its theoretical density. However, improvement with respect to the density achieved under conventional firing conditions can be made. When used as abrasives, this increased density results in an improvement to their performance in abrasive products. Moreover, most of the sol-gel processes described in these references can be improved in terms of the source of alumina monohydrates which they process into an acceptable product. Typically acceptable results are achieved when expensive, very high quality alumina monohydrates are used while the use of less expensive materials may require special processing steps.

The use of various additives to control porosity in alumina-based ceramics produced by a sol-gel process is also known. U.S. Pat. No. 3,417,028 describes a process in which a water-dispersible polyethylene glycol may be incorporated into a hydrous gel of alumina. The mixture is calcined to remove the glycol completely resulting in an inorganic product of increased pore volume and pore size which is useful as a catalyst carrier. Other disclosures in the art include U.S. Pat. No. 2,816,079 (ethylene oxide) and U.S. Pat. No. 3,325,247 (polyethylene glycol). While these references describe useful porous alumina-based ceramics, they do not suggest that improvement in terms of increased density or reduced open porosity of alumina monohydrate based sol-gel process alumina ceramics may be obtained when sintered at high temperature from the use of these organic additives.

SUMMARY OF THE INVENTION

According to this invention, the formation of an alumina-based ceramic, particularly useful as an abrasive grain, by a sol-gel process, the process comprising:
1. Preparing a dispersion of aluminum oxide monohydrate containing a precursor of a modifying additive in the form of a soluble salt;
2. Gelling the dispersion;
3. Drying the gelled dispersion to form a solid;
4. Calcining the solid; and
5. Sintering the solid;

is improved by adding to the dispersion at least one of a water soluble alcohol, glycol or polyether as a densification aid having a vaporization point in excess of the temperature at which the dispersion is dried.

The use of these densification aids generally results in a finished alumina-based ceramic material having a greater density and less open porosity than a comparable material prepared without the use of these aids. As a result, the products produced by this invention generally demonstrate greater hardness, greater fracture toughness and exhibit increased performance when used as abrasive grain. Moreover, this invention permits the use, without special processing steps, of types of aluminum oxide monohydrate which normally produce less satisfactory results. Still further, the use of these aids allows low temperature removal of volatile compounds during calcining and can reduce the cost and render more environmentally efficient the process by reducing the amount of peptizing acid generally required to produce a stable dispersion.

DETAILED DESCRIPTION OF THE INVENTION

Process Steps and Materials

The preparation of alumina-based ceramic materials from a sol-gel process usually begins with the preparation of a dispersion comprising from about 2 to almost 60 weight percent alumina oxide monohydrate (boehmite). The boehmite can either be prepared from various techniques well known in the art or can be acquired commercially from a number of suppliers. Examples of commercially available materials include Dispural® M, produced by Condea Chemical, and Catapal® SB, produced by Conoco Chemicals Division. These alumina oxide monohydrates are in the alpha-form, are relatively pure (including relatively little, if any, hydrate phases other than monohydrates), and have a high surface area. The physical properties of the final fired product will generally depend upon the type alumina monohydrate chosen for the dispersion. For example, when separate batches are made from Dispural® and Catapal® and identically processed, the Dispural® batch will result in a higher density product with less tendency for open porosity than that of the Catapal® batch.

The dispersion contains a precursor of a modifying additive which is added to enhance some desirable property of the finished product or increase the effectiveness of the sintering step. These additives are in the form of soluble salts, typically water soluble, and typically consist of a metal-containing compound and can be a precursor of the oxides of magnesium, zinc, cobalt, nickel, zirconium, hafnium, chromium and titanium. The anion of these salts are relatively strong oxidizing agents and specific examples are nitrate and perchlorate anions. The exact proportions of these components that are present in the dispersion are not critical to this invention and thus can vary to convenience.

A peptizing agent is usually added to the boehmite dispersion to produce a more stable hydrosol or colloidal dispersion. Monoprotic acids or acid compounds which may be used as the peptizing agent includes acetic, hydrochloric formic and nitric acid. Nitric acid is a preferred peptizing agent. Multiprotic acids are normally avoided since they rapidly gel the dispersion making it difficult to handle or mix in additional components. Some commercial sources of boehmite contain an acid titer (such as absorbed formic or nitric acid) to assist in forming a stable dispersion.

The dispersion can be formed by any suitable means which may simply be the mixing of aluminum oxide monohydrate with water containing a peptizing agent or by forming an aluminum oxide monohydrate slurry to which the peptizing acid is added. Once the dispersion is formed, it is then gelled. The gel can be formed by any conventional technique such as the addition of a dissolved or dispersed metal containing modifying additive, e.g. magnesium nitrate, the removal of water from the dispersion or some combination of such techniques.

Once the gel has formed, it can be shaped by any convenient method such as pressing, molding or extrusion and then carefully dried to produce an uncracked body of the desired shape.

If an abrasive mineral is desired, the gel can be extruded or simply spread out to any convenient shape and dried, typically at a temperature below the frothing temperature of the gel. Any dewatering method, including solvent extraction, can be used to remove the free water of the gel to form a solid.

After the solid is dried, it can be cut or machined to form a desired shape or crushed or broken by any suitable means, such as a hammer or ball mill, to form particles or grains. Any method for comminuting the solid can be used and the term "crushing" is used to include all such methods.

After shaping the dried gel can then be calcined to remove essentially all volatiles and transform the various components of the grains into ceramics (metal oxides). The dried gel is generally heated to a temperature between about 400° C. and about 800° C. and held within this temperature range until all free water and over 90 percent of any bound water is removed.

The calcined material is then sintered by heating to a temperature of between about 1200° C. and about 1650° C. and holding within this temperature range until the ceramic is densified to over 85 percent of theoretical density. Of course, the length of time to which the ceramic must be exposed to the sintering temperature to achieve this level of densification will depend upon various factors but usually from about 5 to about 30 minutes is sufficient.

Other steps can be included in this process, such as rapidly heating the material from the calcining temperature to the sintering temperature, sizing granular material, centrifuging the dispersion to remove sludge waste, etc. Moreover, this process can be modified by combining two or more of the individually described steps, if desired.

These conventional process steps and materials are more fully described in pending U.S. application Ser. No. 377,782, entitled, "Superior High Sodium And Calcium Sol-Gel Abrasive And Process For Its Production", by Gerk and Seider, and this application is here incorporated by reference now abandoned in favor of continuation application Ser. No. 602,272, filed Apr. 23, 1984, now abandoned in favor of continuation application Ser. No. 666,133, filed Oct. 30, 1984.

Densification Aids:

The hallmark of this invention is the addition of at least one densification aid to a dispersion containing a precursor of a modifying additive in the form of a soluble salt. The densification aid is at least one of an alcohol, glycol or polyether which has a vaporization point in excess of the temperature at which the dispersion is dried. The vaporization temperature must be high enough that the additive does not volatize during the drying or calcining stage before reaction with the soluble salt anion. Specific examples of densification aids are ethylene or polyethylene glycol, propylene or polypropylene glycol, glycerine and various substituted alcohols, glycols and polyethers, such as di-isopropanolamine. The final product which results from a dispersion containing this combination of a strong oxidizing soluble salt and a densification aid has improved properties.

The polyethylene glycols are commercially available from such suppliers as The Dow Chemical Company or Union Carbide. Carbowax ® is a trade name for these products supplied by Union Carbide. The molecular weight (weight average) of the ethylene glycols, useful to this invention, can vary widely from the monomer to greater than 20 million. Molecular weights of less than about 10,000 are preferred to maintain a reasonably low viscosity for handling the liquid dispersion; however, higher molecular weight may be useful to maintain a high viscosity where desired, such as in extrusion. Molecular weights of greater than 1,000 are preferred if handling of liquid components is undesirable.

The amount of densification aids to be used in the dispersion can vary widely depending upon such factors as the type of additive, the type of soluble salt modifying additive precursor and the amount of precursor in the dispersion. The effectiveness of the densification aid depends on the amount added but appears to be independent of its molecular weight. The amount of densification aid used is typically based on the amount of soluble salt percursor added. A minimum concentration of about 10 weight percent of the amount of oxide equivalent of the modifying additive is generally a sufficient amount to noticeably increase the density of the sintered product, although a minimum concentration of about 25 weight percent is preferred. For example, a final product containing 5 weight percent MgO and 95 weight percent Al$_2$O$_3$ is desired to be made from a liquid dispersion with an equivalent oxide solid content of 10 weight percent. An addition of 10 weight percent of densification aid based upon the amount of the oxide equivalent of the modifying additive would be about a 0.5 weight percent addition based on the total oxide present in the dispersion and about 0.05 weight percent of the total dispersion. A maximum of about 200 weight percent of the modifying additive oxide equivalent is preferred although about 75 weight percent is most preferred. In addition to practical considerations, such as solubility and economics, amounts in excess of the preferred maximum can result in exothermic reactions which these densification aids undergo during low temperature heating. These exothermic reactions in ceramic bodies of any appreciable size (for example, greater than or equal to that of a 20 grit particle of abrasive grain) can result in uncontrolled self-heating of the body in the critical temperature range where volatiles are being removed and result in a strong tendency for cracking from internal pressure.

The manner and point in the process in which the densification aid is added before initial heating of the dried gel is not critical to this invention. Typically, the densification aid is added to the liquid media prior to the addition of aluminum oxide monohydrate, but it can just as easily be added later.

The use of the densification aid as described here results in an increase in density and reduction in the tendency for open porosity of sintered alumina based ceramics produced by the sol-gel process. The effects of these aids can be seen, however, before these products are fully sintered. The densification aids of this invention have a positive effect on the removal of volatiles such as nitrates and bound water during low temperature heating (calcining) and on the amount and form of porosity percent in calcined material before sintering. In fact, it is believed that the improved densification is a result of the effects on the porosity of calcined material of these densification aids. It is also believed that the by-product of the interaction of these densification aids and the soluble salt precursor volatilize at a lower temperature than either the densification aid or the soluble salt will independently. The result is that the open porosity of calcined material, as measured by mercury porosimetry, is increased in volume and of smaller radius than found in product which has not had the addition of these densification aids. Also in products which have not had a strongly oxidizing soluble salt added as an oxide precursor, there is no meaningful effect of these densification aids on either the calcined porosity nor the final sintered density. For example, the addition of polyethylene glycol has little, if any, effect on the calcined porosity or sintered density of a dried aluminum oxide hydroxide dispersion void of a modifying addition (e.g. magnesium nitrate).

The following examples are illustrative of certain specific embodiments of this invention; however, these examples are for illustrative purposes only and are not to be construed as limitations upon the invention.

SPECIFIC EMBODIMENTS

CONTROLS A-B EXAMPLES 1-14

The embodiments of these controls and examples were prepared by dispersing 133 grams of Condea Chemie Dispural ® in 640 ml of water. 7.6 milliliters of concentrated nitric acid diluted with 50 ml water was then added as a peptizing a9ent to form a stable sol. This represents an acid addition of about 0.06 moles nitric acid/mole AlOOH.

A modifying additive was added in the form of a solution containing the equivalent of 23.2 grams of magnesium nitrate dissolved in approximately 63 milliliters of water. When this salt solution was added slowly to the colloidal suspension with continuous mixing, a rapid increase in viscosity occurred which is indicative of gelling. This preparation produces a fired sample containing approximately 6 percent magnesium oxide and 94 percent aluminum oxide.

The gel was then spread in glass trays at approximately one-inch in depth and placed in an 80° C. preset oven for approximately 24 hours. The dry gel was then hand crushed with a mortar and pestle and screened to a −20 to +54 mesh (U.S. Standard) size fraction.

The crushed dried gel was then placed in glass beakers and calcined to 600° C. in an electric furnace. After calcining the material was densified by placing a 10 gm sample contained in a platinum crucible directly in a preheated electric furnace at 1400° C. After holding for 20 minutes, the platinum crucible was removed and the sample allowed to air cool to ambient temperature.

The apparent specific gravity (ASG) of each sintered specimen was measured using ethyl benzene displacement in a pycnometer and the mercury intrusion volume to 60,000 psi measured in a porosimeter. The theoretical ASG of the ceramic of these examples was about 3.89 g/cm$^3$.

For Examples 1-14, different amounts of Carbowax ® (polyethylene glycols produced by Union Carbide Chemical) of a variety of nominal molecular weights were added to the water before preparation of the alumina oxide monohydrate slurry. The nominal molecular weights used were specifically the Carbowax ® product types designated as PEG 600, 3350 and 8000.

The results of these controls and examples are reported in Table I. It may be noted that the negative intrusion volumes (I.V.) reported here are the result of thermal expansion of the mercury in the intrusion cell during measurement. It is believed that a reported intrusion volume of −0.002 to −0.004 cm$^3$/gm represents a sample with no intrusion measurable by this technique.

As is evident from the data in Table I, the addition of polyethylene glycol significantly increases the density of the finished product. The effect is noticeable with as little as 4.2 percent densification aid and has reached a plateau with a 100 percent addition. In addition, there appears to be little or no influence of molecular weight.

TABLE I

| ADDITION OF POLYETHYLENE GLYCOL | | | |
|---|---|---|---|
| Example | Additive | Wt Percent* | ASG (gm/cm$^3$) | I.V. (cm$^3$/gm) |
| A | — | 0.0 | 3.35 | −0.001 |
| 1 | PEG 600 | 4.2 | 3.38 | −0.002 |
| 2 | PEG 600 | 12.5 | 3.44 | −0.003 |
| 3 | PEG 600 | 25.0 | 3.53 | −0.0015 |
| 4 | PEG 8000 | 4.2 | 3.40 | −0.002 |
| 5 | PEG 8000 | 12.5 | 3.43 | −0.0015 |
| 6 | PEG 8000 | 25.0 | 3.51 | −0.0015 |
| 7 | PEG 3350 | 4.2 | 3.38 | −0.0025 |
| 8 | PEG 3350 | 12.5 | 3.42 | −0.002 |
| 9 | PEG 3350 | 25.0 | 3.48 | −0.002 |
| B | — | — | 3.41 | −0.001 |
| 10 | PEG 600 | 4.2 | 3.43 | −0.002 |
| 11 | PEG 600 | 12.5 | 3.47 | −0.003 |
| 12 | PEG 600 | 25.0 | 3.50 | −0.002 |
| 13 | PEG 600 | 50.0 | 3.55 | −0.0015 |
| 14 | PEG 600 | 100.0 | 3.55 | −0.002 |

*Weight percents are based on amount of modifying additive oxide equivalent.

CONTROLS C-D AND EXAMPLES 15-25

Samples were prepared of a composition equivalent to 94 percent alumina, 6 percent magnesia in a similar manner to that of Controls A-B and Examples 1-14, except that a variety of organic additives were employed and that in some cases Catapal ® alumina was used as an alumina source. When Catapal ® was used, the peptizing acid was increased to 0.08 moles nitric acid/mole AlOOH.

The results of these examples are reported in Table II.

TABLE II

Addition of Various Organic Additives

| Ex. | Alumina Source | Additive | Wt Per-cent* | ASG (gm/cm³) | I.V. (cm³/gm) |
|---|---|---|---|---|---|
| C | Dispural | None | — | 3.339 | −0.0015 |
| 15 | Dispural | Glycerin | 50 | 3.509 | −0.0025 |
| 16 | Dispural | Glycerin | 100 | 3.535 | −0.0015 |
| 17 | Dispural | Ethylene Glycol Monomer | 50 | 3.435 | −0.003 |
| 18 | Dispural | Ethylene Glycol Monomer | 100 | 3.521 | −0.0025 |
| D | Catapal | None | — | 3.412 | −0.002 |
| 19 | Catapal | Polyethylene Glycol, 3500 | 100 | 3.60 | −0.0035 |
| 20 | Catapal | Propylene Glycol | 50 | 3.54 | −0.0035 |
| 21 | Catapal | Propylene Glycol | 133 | 3.59 | −0.003 |
| 22 | Catapal | Polyethylene Glycol 5M | 50 | 3.63 | −0.003 |
| 23 | Catapal | Polyethylene Glycol 5M | 133 | 3.60 | −0.004 |
| 24 | Catapal | Di-isopropanol-amine | 50 | 3.63 | −0.004 |
| 25 | Catapal | Di-isopropanol-amine | 133 | 3.57 | +0.0005** |

*Weight percent based on amount of modifying additive oxide equivalent.
**The porosity found here was of large size and believed to be the result of improper mixing.

The data of Table II demonstrates the effectiveness of the ethylene glycols from the monomer up to 20 million molecular weight. In addition, increased densification is demonstrated by the use of glycerin, propylene glycol, and di-isopropanolamine.

CONTROLS E-G AND EXAMPLES 16-31

Material was prepared by following the procedure of Controls A-B and Examples 1-14, except that various sources of aluminum oxide monohydrate were employed in place of Dispural ®. In each case the amount of peptizing acid used was 0.06 moles nitric acid/moles of AlOOH. The alumina sources used were Catapal ® and two experimental samples supplied by other vendors (Aluminas A and B).

The results of these controls and examples are reported in Table III. In addition to ASG and mercury intrusion volume for samples sintered at 1400° C. Table III presents mercury porosimetry data for intrusion volume and dV/dP maximum from 600° C. calcined samples.

TABLE III

Effect of Polyethylene Glycol on Densification Of Various Boehmites

| Ex. | Alumina Source | Organic Additive | Wt Percent* | I.V. (cm³/gm) | $\frac{dV}{dP}$ (max) (Radius Å) | ASG (gm/cm³) | I.V. (cm³/gm) |
|---|---|---|---|---|---|---|---|
| E | Alumina A | — | — | 0.238 | 42.0 | 3.49 | +0.0435 |
| 26 | Alumina A | PEG 600 | 50 | 0.295 | 32.5 | 3.55 | +0.0075 |
| 27 | Alumina A | PEG 600 | 100 | 0.321 | 33.0 | 3.56 | +0.0110 |
| F | Alumina B | — | — | 0.210 | 38.0 | 3.41 | +0.022 |
| 28 | Alumina B | PEG 600 | 50 | 0.248 | 28.5 | 3.44 | 0.000 |
| 29 | Alumina B | PEG 600 | 100 | 0.275 | 29.5 | 3.45 | −0.0035 |
| G | Catapal$^R$ | — | — | 0.190 | 34.0 | 3.32 | +0.004 |
| 30 | Catapal$^R$ | PEG 600 | 50 | 0.237 | 29.5 | 3.44 | −0.001 |
| 31 | Catapal$^R$ | PEG 600 | 100 | 0.225 | 28.5 | 3.54 | −0.003 |

*Weight percent based on amount of modifying additive oxide equivalent.

A review of the data of Table III demonstrates in each case that for sintered material the ASG is increased by the addition of a polyethylene glycol and that the mercury intrusion volume is decreased or eliminated. In addition, it demonstrates that intrusion volume of samples calcined at 600° C. is increased and the nominal radius of the porosity (represented by dV/dP (max.)) is decreased, and upon sintering, this results in denser products.

CONTROL H AND EXAMPLE 32

Abrasive grain was made using Catapal ® alumina with and without a polyethylene glycol densification aid. The material was processed identically except that for Example 32, the equivalent of about 66 weight percent, based upon the oxide equivalent of the modifying additive, of a Carbowax ® was added to the dispersion.

In particular, 103.5 pounds of Condea Chemie Dispural ® was dispersed in an industrial mixer containing 33 gallons of water. 2700 ml of concentrated technical grade nitric acid diluted with 7 gallons of water was then added to the dispersion to produce a stable sol. Mixing of the sol was continued for five minutes. For Example 32, 1400 grams of Carbowax, PED 3350 was dissolved in the water before the addition of the aluminum oxide monohydrate.

In a separate container a magnesium nitrate solution was prepared by dissolving 3222 grams of magnesium hydroxide in 5 gallons of water containing 22.5 pounds of concentrated nitric acid. This solution was added to the previously prepared dispersion while mixing, gelling occurred immediately and mixing was continued for an additional 5 minutes.

The gel was then transferred to stainless steel trays at a depth of between 2.5 and 3.75 centimeters. The trays were placed in an electrically heated dryer at 250° F. to dry the gel which took about 48 hours.

The dry gel was passed through a roll crusher to reduce it to −20 mesh granules. A size fraction −20 to +48 mesh was separated by sieving.

The granules were calcined at 575° C. for about 30 minutes and were then fired in a rotary tube furnace at 1.2 revolutions per minute at about 1395° C. It is estimated that in this furnace the granulars were brought to temperature, held at temperature, and cooled in consecutive 7 minute periods.

The sintered granules were size classified on a conventional sifter to meet the ANSI 74.18-1977 specification for 36 grit.

A single coated abrasive material was made by electrostatically coating the 36 grit grain on a vulcanized fiber backing.

The fiber selected was abrasive grade 0.030 inch vulcanized fiber, having a nominal weight of 67 pounds per ream (480-9×11 sheets).

A maker adhesive mix, consisting of a commercial one-stage, liquid phenolic resin with a formaldehyde to phenol ratio of about 1:1 and ground limestone with an average particle size of between 17 and 25 microns, was made using a 1:1 net weight mix proportion.

The maker mix was then heated to 90° F. and roll coated on the fiber backing. About 23 pounds of adhesive per ream was applied.

Using conventional sandpaper making equipment, the 36 grit abrasive was electrostatically projected onto the fiber carrying the maker mix with about 62 pounds per ream of grain being applied.

The abrasive adhesive coated backing was then heated to 175° F. for one hour and 200° F. for two hours in the maker rack. After drying, a size coat was then applied by standard roll coating methods with approximately 23 lbs./ream being applied. The size mix consisted of the same 1:1 phenolic resin-filler ratio. Drying and curing was then accomplished by heating the coated material for one hour at 150° F., four hours at 175° F. and 16 hours at 225° F.

After curing the material was humidified in the conventional manner to a moisture content of less than 8 percent by weight. The material was then uniformly flexed and die cut into seven inch discs. Five of these discs were then evaluated on a conventional pneumatic disc grinder using quenched and tempered 4140 steel (hardness 285–320 BHN) as a workpiece. In this test the abrasive disc was placed on the disc grinder in the standard manner and a $1 \times 2 \times 11$ inch workpiece was positioned so that it engaged the disc on the 1 inch flat side at a 10–15″ angle. The disc was passed back and forth along the workpiece.

The abrasive disc in this test was rotated at a nominal 5400 RPM's on a hard rubber type back-up pad 7″ in diameter. Eight pounds of dead weight in-feed force was exerted on the workpiece. Testing was for 30 seconds after which stock removed from the bar was measured (weight before grind-weight after grind) and recorded. This sequence was continued until the measured stock removed was 5 grams or less per grinding interval. Total stock removed in this manner for each test disc is then calculated and defined as the "cut". The average of five such tests is defined as the "average cut".

Physical data and the results of grinding tests are presented in Table IV.

TABLE IV

| | | | Grinding Tests | | | |
|---|---|---|---|---|---|---|
| Ex. | Additive | ASG Percent | I.V. (gm/cm$^3$) | (cm$^3$/gm) | Average Cut (gm) | Standard Deviation (gm) |
| H | — | — | 3.405 | 0.000 | 564.6 | 43.12 |
| 32 | PED 3350 | 66 | 3.590 | −0.001 | 668.4 | 30.17 |

A review of the data demonstrates that the density of the abrasive grain has increased with the addition of 66 percent of an ethylene glycol to the dispersion. In addition, the average total cut of fibre discs made from these abrasive grains has increased significantly from 564.6 grams to 668.4 grams.

EXAMPLES 33–42

Material was prepared with and without a 100 percent addition of polyethylene glycol as in Controls A–B and Examples 1–14 using Condea Chemie Dispural ®; however, instead of nitric acid, 0.06 moles hydrochloric acid/mole AlOOH was used as a peptizing acid and magnesium chloride was substituted, on a molar equivalent, for magnesium nitrate. The normal oxide composition was again 94 weight percent alumina and 6 weight percent magnesia. In addition, samples were calcined at 200°, 300°, 400°, 500° and 600° C. before sintering in the normal manner. The result of porosimetry and ASG measurements are given in Table V.

TABLE V

Use of Densification Aid with a Chlorine Based Alumina

| | | | As Calcined | | As Sintered | |
|---|---|---|---|---|---|---|
| Ex. | Additive | Temperature (C.°) | I.V. (cm$^3$/gm) | dV/dP (max.) (Å Radius) | ASG (gm/cm$^3$) | I.V. (cm$^3$/gm) |
| 33 | Yes | 200 | 0.094 | 21.0 | 3.454 | 0.0155 |
| 34 | Yes | 300 | 0.147 | 27.0 | 3.451 | 0.0175 |
| 35 | Yes | 400 | 0.186 | 31.0 | 3.480 | 0.0200 |
| 36 | Yes | 500 | 0.263 | 36.0 | 3.547 | 0.0245 |
| 37 | Yes | 600 | 0.272 | 39.0 | 3.563 | 0.0230 |
| 38 | None | 200 | 0.119 | 23.5 | 3.386 | 0.0275 |
| 39 | None | 300 | 0.147 | 29.0 | 3.447 | 0.0220 |
| 40 | None | 400 | 0.156 | 31.0 | 3.407 | 0.0260 |
| 41 | None | 500 | 0.237 | 38.0 | 3.565 | 0.0380 |
| 42 | None | 600 | 0.259 | 38.0 | 3.494 | 0.0370 |

A review of the data of Table V demonstrates that in a chlorine-based system, which is a relatively weak oxidizing anion, there is little, if any, effect of the densification aid on the amount or size of the porosity in the calcined material (as compared to the nitrate based systems of Table III). In addition, a review of the data for sintered material demonstrates little improvement in densification.

Although the invention has been described in considerable detail through the preceding examples, these examples are for the purposes of illustration only. Variations and modifications can be made by one skilled in the art without departing from the spirit and scope of the invention as described in the following claims.

I claim:

1. In the sol-gel process for forming a dense, solid, alumina-based ceramic, the process comprising:
   a. preparing an aqueous dispersion of aluminum oxide monohydrate containing a precursor of a modifying additive which is a metal-containing compound in the form of a strongly oxidizing, soluble salt;
   b. gelling the dispersion;
   c. drying the gelled dispersion to form a solid;
   d. calcining the solid; and
   e. sintering the calcined solid,
   the improvement comprising adding to the aqueous dispersion at least about 10 weight percent, based upon the oxide equivalent of the soluble salt precursor, of at least one densification aid selected from the group consisting of ethylene glycol, polyethylene glycol, propylene glycol, polypropylene glycol, glycerine, and di-isopropanol amine, said densification aid providing in the ceramic produced by said process a density which is noticeably increased over that produced by the same process without said densification aid.

2. The process of claim 1 where the metal-containing compound is at least one precursor of the oxides of magnesium, zinc, cobalt, nickel, zirconium, hafnium, chromium and titanium.

3. The process of claim 2 where the anion of the precursor is a nitrate or perchlorate.

4. The process of claim 1 where the weight average molecular weight of the densification aid does not exceed about 20 million.

5. The process of claim 1 where the weight average molecular weight of the densification aid does not exceed about 10,000.

6. The process of claim 1 where the amount of the densification aid is at least about 25 weight percent of the amount of oxide equivalent of the modifying additive, 7. The process of claim 6 where the maximum amount of densification aid does not exceed about 200 weight percent of the amount of oxide equivalent of the modifying additive.

8. The process of claim 6 where the maximum amount of densification aid does not exceed about 75 weight percent of the amount of oxide equivalent of the modifying additive.

9. The process of claim 1 where the dense, alumina-base ceramic is an abrasive grain.

* * * * *